United States Patent [19]

Yamaguti

[11] 4,047,224
[45] Sept. 6, 1977

[54] GHOST REMOVING SYSTEM FOR USE IN TELEVISION RECEIVER

[75] Inventor: Namio Yamaguti, Ibaragi, Japan

[73] Assignee: Matsushita Electric Industrial Co., Ltd., Kadoma, Japan

[21] Appl. No.: 661,598

[22] Filed: Feb. 26, 1976

[30] Foreign Application Priority Data

Feb. 28, 1975    Japan ............................. 50-25136

[51] Int. Cl.$^2$ ............................................. H04N 5/14
[52] U.S. Cl. .................................... 358/166; 358/905
[58] Field of Search .................. 178/7.3 R, DIG. 44, 178/DIG. 12; 325/473–476; 358/160, 187, 166

[56] References Cited

U.S. PATENT DOCUMENTS

3,956,585   5/1976   Butler et al. ................ 178/DIG. 44
3,961,172   6/1976   Hutcheon ....................... 325/476 X

Primary Examiner—Richard Murray
Assistant Examiner—Mitchell Saffian
Attorney, Agent, or Firm—Sughrue, Rothwell, Mion, Zinn and Macpeak

[57] ABSTRACT

Ghost phenomenon on a screen of a television receiver is removed by supplying an intermediate frequency video signal including a desired signal and a ghost signal to a pair of parallel circuits, each including a synchronous or multiplication detection circuit. The detection axis or reference phase of the first detection circuit differs from the second detection axis or reference phase by an amount equal to the phase difference between the desired signal and the ghost signal. Either the detected video signal in one of the parallel circuits or the intermediate frequency signal applied to one of the parallel circuits is delayed an amount equal to the delay time between the desired signal and ghost signal, and the signals from both circuits are combined in a suitable ratio to cancel the ghost signal.

18 Claims, 14 Drawing Figures

GHOST REMOVING SYSTEM FOR USE IN TELEVISION RECEIVER

BACKGROUND OF THE INVENTION

The present invention relates to a ghost removing system for a television receiver.

According to a recent, remarkable increase of high buildings in city areas, the ghost phenomenon on screens of the television receivers has become a serious problem. However, no broadly effective technique for resolving the problem has been developed, although some ideas have been proposed which are applicable to the resolution of the problem in specific situations.

As is well known, the ghost phenomenon is due to the reflections of electromagnetic waves by tall obstructions such as high buildings or mountains. Thus, a signal received by an antenna includes a desired signal wave and an undesired signal wave; the latter being the desired signal reflected from a building or the like, and being known as a ghost signal. The signal received by the antenna is fed to a tuner in which the signal is converted in frequency to an intermediate frequency (IF) and amplified in a VIF stage.

Since there is a phase difference between the desired wave signal and the ghost signal, the output of the VIF stage includes both the desired signal and the ghost signal which are out of phase. The ghost image on the television screen varies depending upon the intensity of the ghost signal, the time delay between the desired signal and the ghost signal, and the phase difference between the carrier waves of the direct wave, (desired signal carrier), and the indirect wave, (ghost signal carrier).

That is, the ghost signal and the desired signal appear at the same polarity, at the reversed polarity or at an intermediate state therebetween according to the phase difference between the carriers of the desired direct wave and the reflected wave. Furthermore, in a color television system, since the phases of the color subcarrier components of the direct and the reflected waves are also shifted relative to each other, the color of the ghost may differ from that of the direct wave. This will make the ghost phenomenon more conspicuous than that in the monochromatic system.

Three general concepts have previously been proposed for preventing the ghost phenomenon from occurring. They are: (a) an improvement of the directivity of the antenna system, (b) a synchronous detection of the video signal with orthogonal detection axes and (c) an addition or subtraction between a direct VIF signal or image signal and that delayed by a time corresponding to an arrival time difference between the direct signal and the ghost.

The technique (a), above, is concerned with the antenna design per se and no consideration is given to the television receiver itself. Of course, the improvement in antenna directivity is very important for excluding ghost waves. However, an improvement in directivity may be difficult, and even though it can be much improved, it is impossible to apply the improved antenna to locations under various circumferences to eliminate the ghost at these locations.

The techniques (b) and (c) are intended to eliminate the ghost phenomena by processing the image signal or IF signal in the television receiver, respectively.

Figure 1:
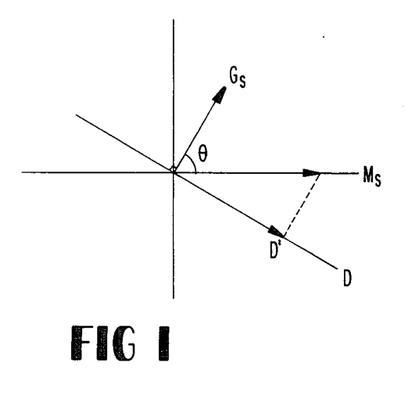
FIG. 1 is an explanatory illustration of a conventional method for removing the ghost component by using synchronous detection.

FIG. 1 shows the principle of the method (b) in vector form. In FIG. 1, a phase difference between the desired wave $M_s$ and the ghost wave $G_s$ is represented by $\theta$. In detecting the signal containing the waves M and G, a recently developed synchronous detector is used. Setting a detection axis D normal to the ghost wave $G_s$, the detection output D' is obtained and thus the ghost wave is eliminated.

Figure 2:
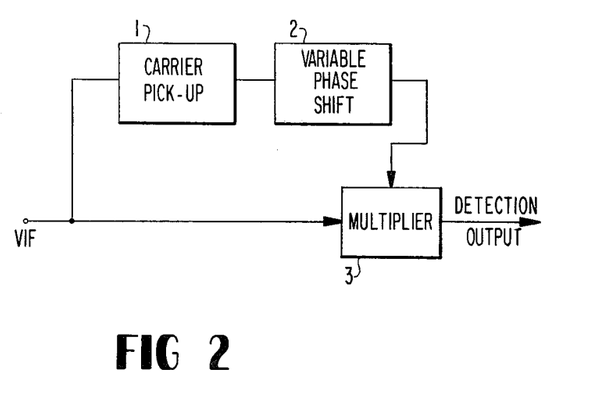
FIG. 2 is a block diagram of a prior art apparatus for performing the method of FIG. 1.
Figure 3:
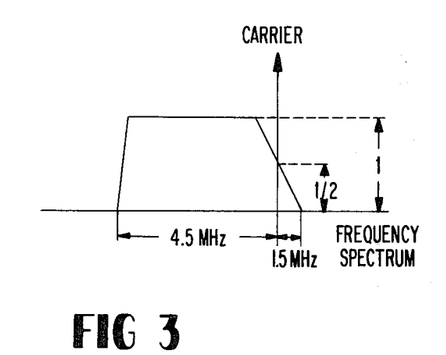
FIG. 3 shows a band-pass characteristics of VIF signal.

FIG. 2 is a schematic block diagram for performing the method in FIG. 1. In FIG. 2, the VIF signal produced in the conventional manner is supplied to a carrier-pickup circuit 1 to derive the carrier from the VIF signal. The carrier is supplied to a variable phase shifter (2) to shift the phase thereof to be orthogonal to the VIF signal carrier of $G_s$. The VIF signal is multiplied by the phase shifted carrier wave in a multiplier 3 which acts as and is often referred to as a synchronous detector. This method seems to be satisfactory and is practically effective to some extent. However, there is a disadvantage inherent to this method. That is, as is well known the television signal is transmitted in a vestigial side band. Further, since the VIF stage has a band-pass characteristic, the frequency band of the television signal is further narrowed, resulting in substantial single side band signal as shown in FIG. 3, which is to be detected. Accordingly, the ghost component contained in the VIF output includes not only the in-phase component but also the 90° out of phase component. In this case, a component orthogonal to the $G_s$ component, i.e., high frequency component, always exists. It is desirable to show, in vector form, a composite component of the $G_s$ and orthogonal component. However, it is hardly possible to do so because the amplitude of the orthogonal component always varies causing the $\theta$ to change. Therefore, the orthogonal component is omitted from FIG. 3. When the VIF output is detected with the detection axis D, the orthogonal ghost component will still appears in the detection output. Therefore, even if the detection axis D is most suitably adjusted, it is impossible to completely eliminate the ghost image. Further if the adjustment of the detection axis D is performed by shifting it with respect to the in phase component $M_s$ of the desired wave, the orthogonal component of the desired wave in the detection output will be emphasized causing the quality of reproduced image on the television screen to be degraded. The component orthogonal to the desired wave $M_s$ is also omitted from FIG. 3 for the same reason as mentioned. At any rate, the technique (b) has not been put into actual practice due to the above mentioned disadvantages.

Figure 4:
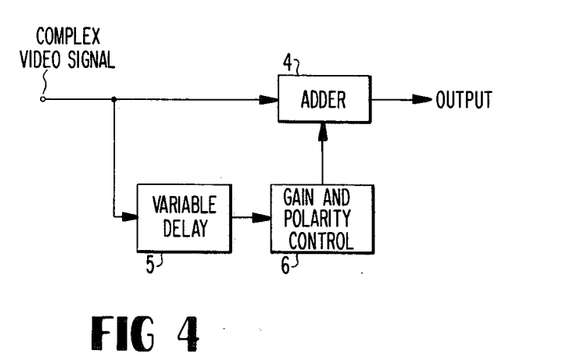
FIG. 4 is a block diagram of a prior art apparatus for performing a ghost removing method in which the VIF or video signal is delayed by a time corresponding to a difference in arrival time between the desired signal component and the ghost signal component.
Figure 5:
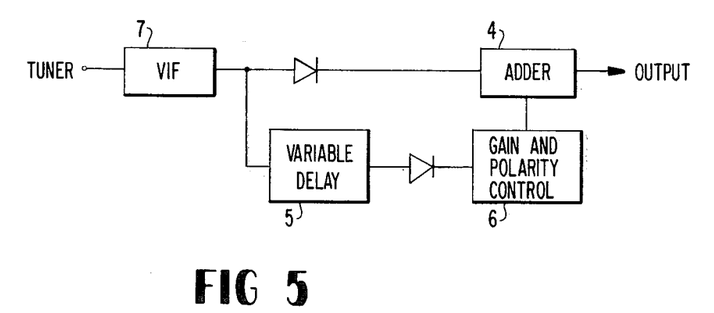
FIG. 5 is a block diagram which is a modification of the apparatus in FIG. 4.

The technique (c) is well known as disclosed in, for example, U.S. Pat. No. 3,482,168 titled "Device for Removal of Interfering signals", issued to Saburo Sasao on Dec. 2, 1969, and also as disclosed in Japanese Patent Publication No. 43-21885, published Sept. 19, 1968, in the name of Saburo Sasao and entitled, "Disturbing Signal Removing Device". There are two basic systems using technique (c). The only difference between the two systems is in the stage in which the addition or subtraction is performed. That is, in the first system the addition or subtraction is performed prior to the video detection while in the second system, it is performed after the detection. The above mentioned Sasao U.S. Patent discloses one example of the latter system. Also, FIG. 5 shows one example of a system according to technique (c), wherein detection, i.e., demodulation of the VIF into the complex video, occurs after delay and addition. FIG. 4 shows an example where detection occurs prior to delay and addition. The primary difference in the circuits is the frequency bands over which they must operate.

In the first system (e.g., FIG. 5), the RF or VIF signal is delayed by a time corresponding to a difference in arrival time between the desired signal and the ghost signal, the phase and polarity of the delayed signal are regulated to make them suitable for addition, and then the addition is performed. This is the most appropriate system in principle. However, a high performance and inexpensive continuously variable delay line required to delay the RF or VIF signal is difficult to obtain, and even if obtainable, the stability of the delay line with respect to the variation of the surrounding conditions must be very high due to the fact that the phase regulation must be performed after a relatively long delay time. For example, when an acoustic surface delay line of lithium-niobium monocrystalline plate material is used to delay the RF or VIF signal by 5 $\mu$ sec., the delay time may be varied by 0.015 $\mu$ sec for every temperature variation of 10° C. This corresponds to a phase shift of 317° for a signal frequency of 58.75 MH$_z$. It should be noted that the temperature dependency of delay time of the LiNb monocrystalline plate is 30 ppm/° C which is one of the best delay lines at present. Therefore, it is very difficult to employ this system in a television receiver.

FIG. 4 shows a block diagram of an example according to the second type system in which a complex video signal is supplied to one input of an adder 4 and also to a variable delay 5. The output of delay means 5 is connected to a gain and polarity control circuit 6, whose output is connected to the other input of the adder 4. In the systems shown in FIGS. 4 and 5, the problem inherent to the method (b) may be resolved. However, the correction of the phase difference between the ghost and the desired wave is impossible and therefore the ghost removal may be possible in only certain situations where the image of the phase difference is adequate to these systems.

However, the system in FIG. 4 provides a possibility of using a continuously variable delay line such as a Bucket-Brigade device (BBD) as the variable delay line 5, and the system in FIG. 5 provides a possibility of using such a delay device as above after the gain and polarity control circuit 6. Therefore, technique (c) is much more practical than technique (b). As to "Bucket-Brigade device" reference should be made to IEEE Journal of Solid-State Circuits Vol. SC-4, No. 3, June 1969, pages 131 to 134, "Bucket-Brigade Electronics— New Possibilities for Delay, Time-Axis Conversion, and Scanning" by F, Sangster et al.

SUMMARY OF THE INVENTION

An object of the present invention is to provide a method for substantially completely removing the ghost wave component in a television receiver.

Another object of the present invention is to provide an apparatus to be included in a television receiver for performing the above method.

Another object of the present invention is to provide an apparatus for removing the ghost component, which is relatively simple in construction and economical.

A further object of the present invention is to provide a ghost removing apparatus by combining the synchronous detection and the addition subsequent to detection in such a way that the defects inherent to the synchronous detection and the addition subsequent to detections are eliminated.

The above objects are achieved by synchronously detecting the intermediate frequency video signal in a television receiver with two synchronous detectors operating at different reference phases. The difference in the reference phases being the same as the phase difference between a desired wave and the ghost wave. Also either of the detection outputs is delayed by a time corresponding to a difference in arrival time between the desired wave and the ghost wave, and then the delayed and the undelayed detection outputs are combined to remove the ghost signal. The delay stage may be placed prior to the detection with either axis.

These and other objects and features of the present invention will become apparent by reading the following description of the preferred embodiments of the present invention with reference to the attached drawings.

DETAILED DESCRIPTION OF THE PREFERRED EMBODIMENTS

Figure 6:
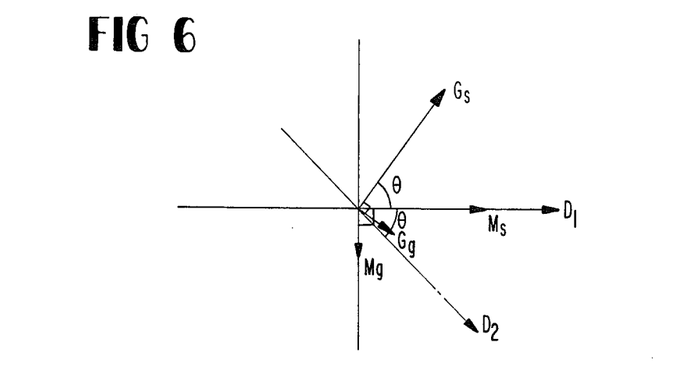
FIG. 6 is an explanatory vector diagram for explaining the principle of the present invention.

Prior to the detailed description of embodiments of the present invention, the principle of this invention will be described with reference to vector components in FIG. 6.

The present invention utilizes the synchronous detection twice. That is, a pair of detection axes $D_1$ and $D_2$ are set as shown with a phase angle $\theta$, therebetween, corresponding to the phase difference between the desired wave and the ghost wave. A result of the detection by the first detection axis $D_1$ is a complex signal including a component of the ghost wave $G_s$ which is in-phase with $D_1$. On the other hand, for the second detection axis $D_2$, the output contains a component of the complex signal detected with an angle $\theta$ with respect to the in-phase component $M_s$ of the desired wave. Therefore, the ghost output obtainable by the detection using the first detection axis $D_1$ and the desired wave output obtainable by the detector using the second detection axis $D_2$ are analogous to the in-phase components $G_s$ and $M_s$ and the orthogonal components $G_g$ and $M_g$, all inclusive. That is, putting the detection outputs with the first detection axis $D_1$ and the second detection axis $D_2$ as $F_1(t)$ and $F_2(t)$, respectively, the following expressions are established.

$$F_1(t) = M_s(t) + G_s(t) \cos \theta + G_g(t) \sin \theta \qquad (1)$$

$$F_2(t) = M_s(t) \cos \theta + M_g(t) \sin \theta + G_s(t) \cos 2\theta + G_g(t) \sin 2\theta \qquad (2)$$

Thus, the ghost component $G_s(t) \cos \theta + G_g(t) \sin \theta$ in equation (1) is at the same vector angle as the desired component $M_s(t) \cos \theta + M_g(t) \sin \theta$ in the equation (2). Therefore, it is possible to substantially remove this ghost component by delaying the output obtained from the second detection axis $D_2$, regulating the gain thereof, and subtracting the delayed ghost component from the output obtained by the first detection axis $D_1$.

This will be described in detail.

It is assumed that the arrival time of the ghost wave is delayed by $\Delta t$ from that of the desired wave and the amplitude of the ghost wave is K times that of the desired wave. That is, $$G_s(t) = KM_s(t - \Delta t)$$

$$G_g(t) = KM_g(t - \Delta t).$$

Therefore, if $F_2(t)$ is delayed by $\Delta t$, multiplied by K and subtracted from $F_1(t)$. The resultant composite output $F(t)$ can be represented as follows.

$$F(t) = F_1(t) - KF_2(t-\Delta t) = M_s(t) - KG_s(t-\Delta t) \cos 2\theta - KG_g(t-\Delta t) \sin 2\theta = M_s(t) - K^2 M_s(t-2\Delta t) \cos 2\theta - K^2 M_g(t-2\Delta t) \sin 2\theta$$

If K is smaller than unity, which is the normal case, the terms including $K^2$ can be neglected and it becomes as follows.

$$F_t \approx M_s(t)$$

Therefore the ghost component can be removed. In this operation, if the phase angle $\theta$ between the first and second detection axes $D_1$ and $D_2$ can be constant, i.e., the phase difference between the desired wave and the ghost wave is constant, the first detection axis $D_1$ need not always be in-phase with the component $M_s$ of the desired wave. In the latter case, not only the component $M_s$ but also the orthogonal component $M_g$ of the desired wave may appear on the television screen causing the image quality on the screen to be varied. However, the effect of the removal of ghost is still obtainable.

Figure 7:
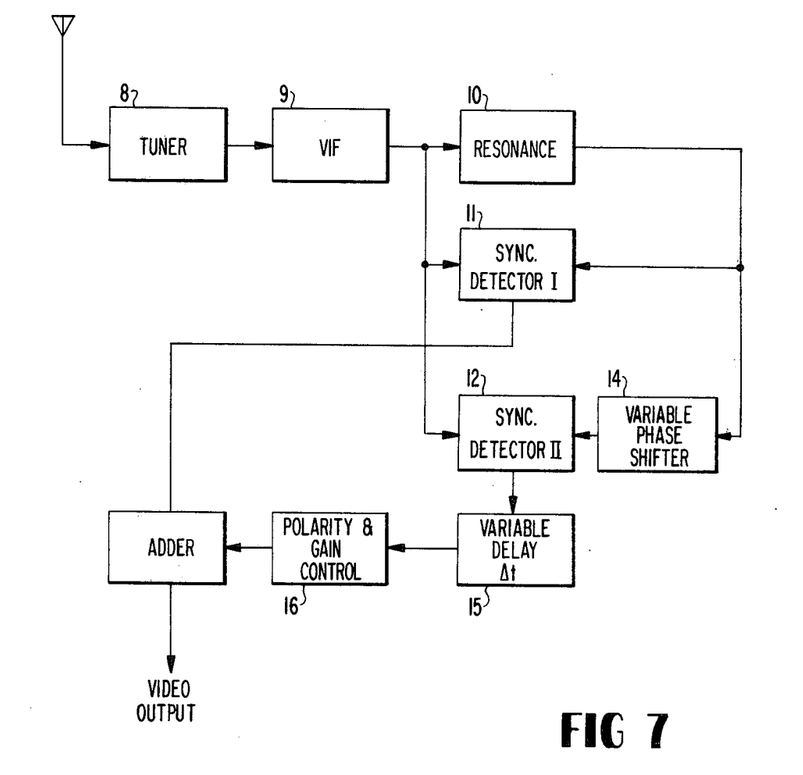
FIG. 7 is a block diagram of an embodiment of the present invention utilizing the principle in FIG. 6.

FIG. 7 shows an embodiment of the present invention according to the principle as mentioned hereinbefore. In FIG. 7, a signal containing the desired wave component M and the ghost wave component G is received by an antenna 7, passed through a tuner 8 and a VIF stage 9, and supplied to the inputs of a pair of synchronous detectors 11 and 12. The same signal is also supplied to a resonance circuit 10 in which an image carrier component of the signal is picked up. The output of the resonance circuit 10, i.e., the image carrier is applied to the other input of the synchronous detector 11 and to a variable phase shifter 14 to suitably shift the phase of the carrier so that it corresponds to the phase difference between the desired wave and the ghost wave. The output of the variable phase shifter 14 is supplied to the other input of the second synchronous detector 12.

In the detector 11, the signal is multiplied by its carrier and, in the detector 12, the signal is multiplied by its carrier whose phase is shifted by an amount corresponding to the phase difference between the desired wave and the ghost wave. Either of the outputs of the detectors 11 and 12 (in this instance, the output of the detector 12) is delayed by $\Delta t$ by a variable delay 15, $\Delta t$ corresponding to the difference in arrival time between the desired wave and the ghost wave. The delayed output is supplied to a gain and polarity control 16 to multiply the amplitude thereof by K and to define the polarity thereof suitably.

The output of the gain and polarity control 16 is supplied to one input of an adder 17 whose other input is supplied with the output of the first detector 11. In the adder circuit 17, the output of the detector 11 and the output of the detector 12, which is delayed suitably and whose gain and polarity are regulated suitably, are added, resulting in the output $M_s(t)$ mentioned previously with reference to FIG. 6.

Figures 8, 9:
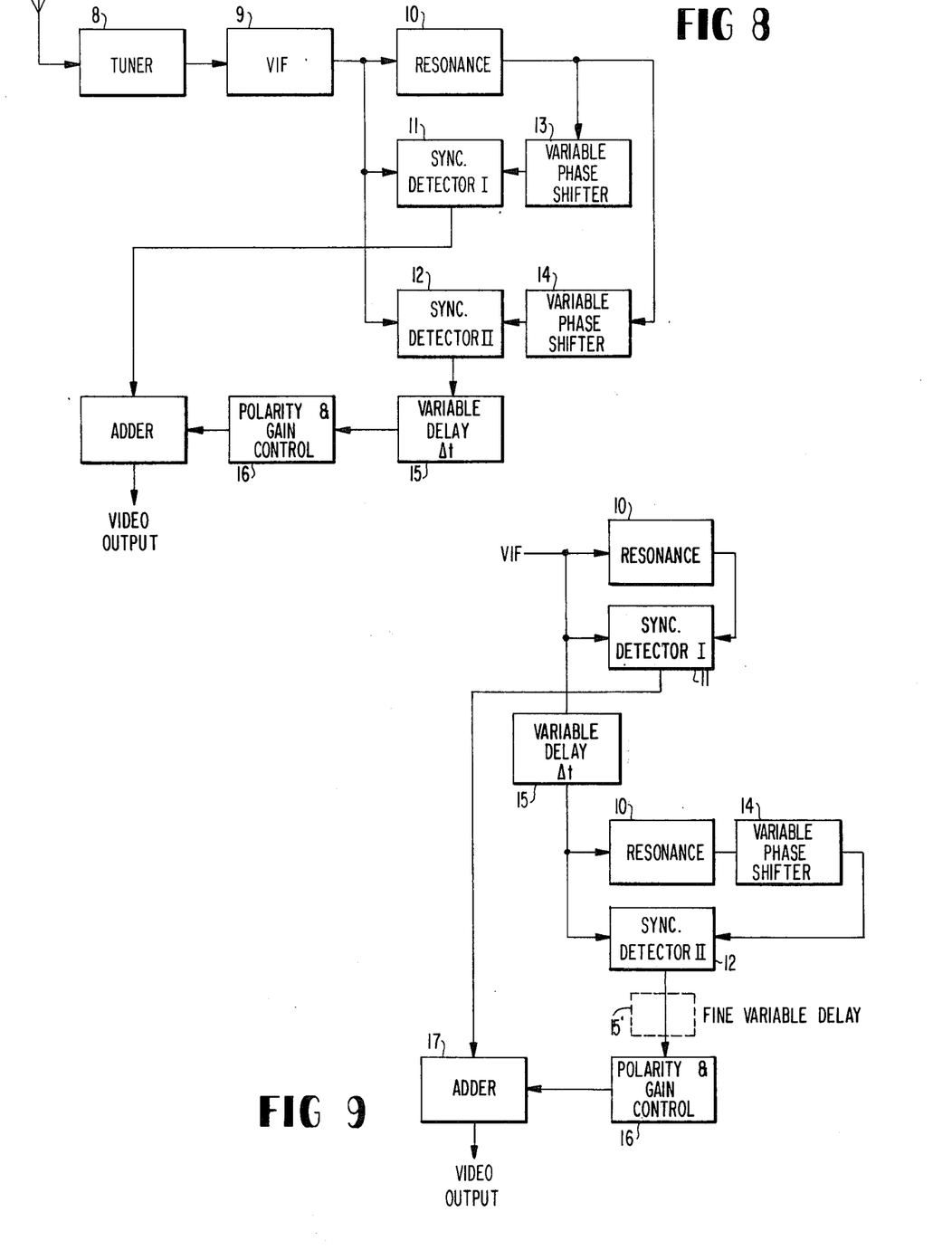
FIG. 8 is a block diagram of another embodiment of the present invention.
FIG. 9 is a block diagram of a further embodiment of the present invention.

FIG. 8 shows a modification of the circuit in FIG. 7, in which a second variable phase shifter 13 is added. The operation of this circuit is the same as that of the circuit in FIG. 7, provided that there is a phase difference between the outputs of the variable phase shifters 13 and 14 which corresponds to the phase difference between the desired wave and the ghost wave.

FIG. 9 shows another embodiment of the present invention in which the carrier pickup circuit is provided in parallel with each synchronous detector and the variable delay line 15 is inserted between the carrier pickup circuits 10 and 10' which provide a time delay corresponding to the difference in arrival time between the desired wave and the ghost wave. In operation the VIF signal is supplied to one input of the synchronous detector 11, the carrier pickup circuit 10 and the variable delay line 15. In the detector 11, the VIF signal and the carrier picked up by the circuit 10 are multiplied.

The VIF signal delayed by $\Delta t$ by the variable delay line 15 is supplied to the second synchronous detector 12 and the second resonance circuit 10'. The carrier derived by the second resonance circuit is supplied to the variable phase shifter 14 to shift the carrier phase by a suitable angle corresponding to the phase difference between the desired wave and the ghost wave. The phase shifted carrier is supplied to the other input of the synchronous detector 12 to detect the VIF with the phase shifted carrier.

The output of the synchronous detector 12 is further regulated by the gain and polarity control 16 so that the gain and polarity of the detector output is suitable to be processed subsequently as previously explained. The output of the first detector 11 and the suitably regulated output of the second detector 12 are added in the adder 17 to produce an image signal having no ghost component as in the previous embodiment.

Figure 10:
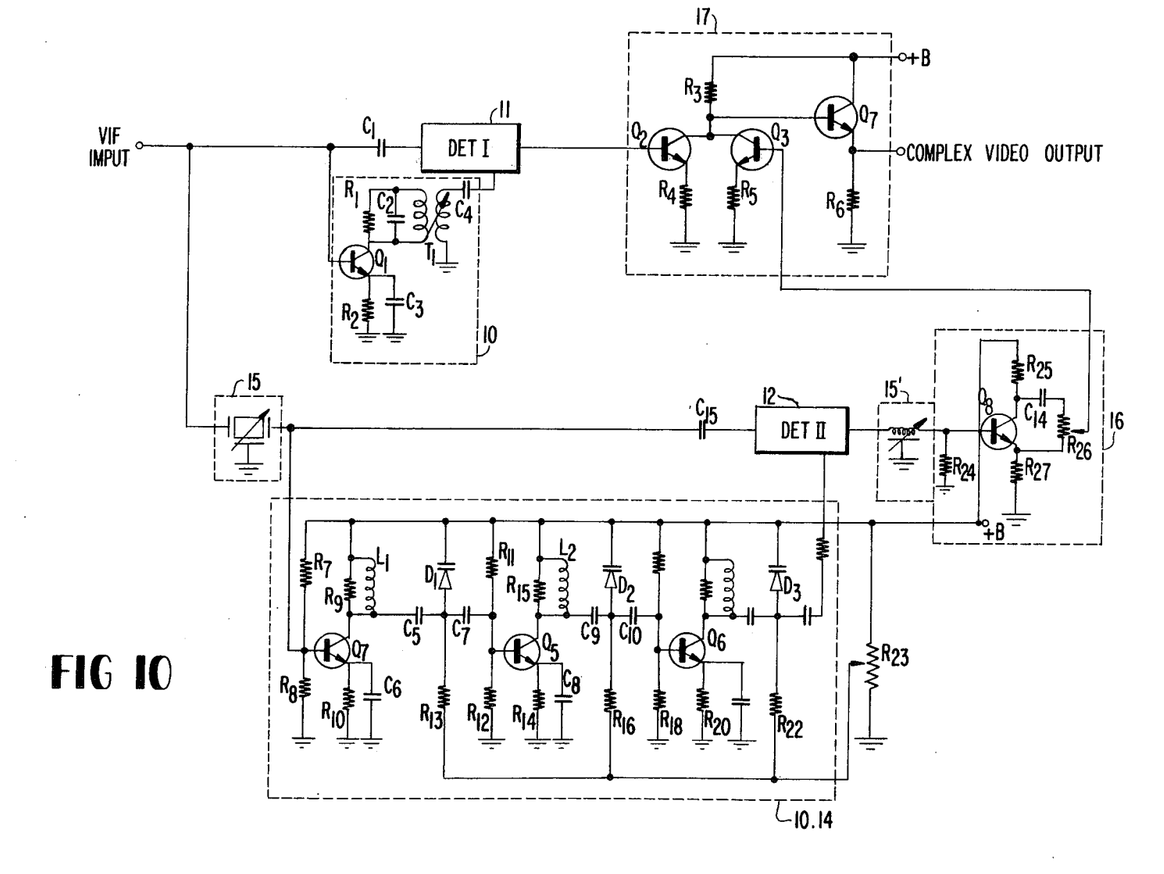
FIG. 10 is a circuit diagram showing the block diagram in FIG. 9.

FIG. 10 shows one example of a circuit diagram of the embodiment of FIG. 9. In this example a surface wave delay line, the details of which are shown in FIG. 11, is used as the variable delay line 15 to delay the VIF signal.

Referring now to FIG. 10, the VIF signal passes a capacitor $C_1$ and enters into the first input of the synchronous detector 11. The VIF signal is also supplied to the base of a transistor $Q_1$ of the first carrier pick up or resonance circuit 10. The VIF carrier is picked up by a resonance circuit comprising capacitor $C_2$ and transformer $T_1$. The carrier is supplied to the second input of the detector 11, which is comprised of a synchronous detection or multiplication detection circuit to be described with reference to FIG. 12.

Figure 11:
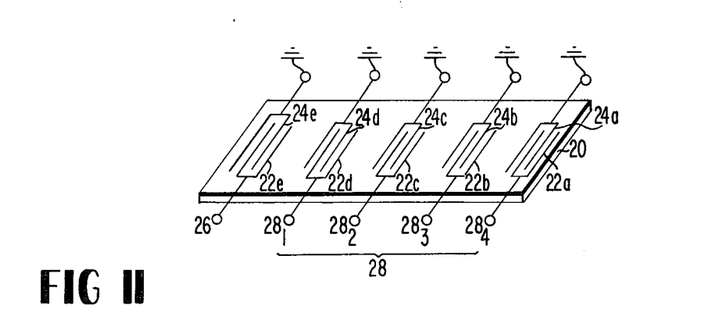
FIG. 11 is a schematic illustration of an example of a surface wave delay line suitable to use in the circuit in FIG. 10.

The VIF signal is further supplied to the surface wave delay line 15, shown schematically in FIG. 11, which is constructed with a substrate 20 of $LiNbO_3$ monocrystalline material and a plurality of electrode pairs, each including juxtaposed comb type electrodes 22 and 24 vapor-deposited on the substrate 20. The electrodes 24 are grounded and the electrodes 22 are connected to a terminals 26 and $28_1$–$28_4$ respectively. The leftmost electrode pair includes a grounded electrode 24a and juxtaposed electrode 22a connected to an input terminal 26, to which the VIF signal is supplied. The electrodes 22b to 22e are connected to output terminals $28_1$ to $28_4$, respectively. As is well known, the time delay in this surface wave device is provided by utilizing the time delay of an ultrasonic wave travelling along the surface of the substrate 20. Although $LiNbO_3$ is used as the substrate material in this embodiment, any other suitable material may be used provided that the surface wave delay effect is obtainable.

The delay time is determined by the distance between the input electrode 26 and the output electrode 28. Since the delay line utilizes a separate tap type switching system, the regulation of the delay time becomes discontinuous. Therefore, a distributed constant delay line 15' is used after the detector in order to make a fine regulation of the delay time possible.

Further, since the insertion loss of the surface wave delay line 15 is in the range of 10 to 20db, in practice an amplifier is connected to the output of the delay line 15. The amplifier is omitted from FIG. 12 for simplicity.

The output of the delay line 15 passes through a capacitor $C_{15}$ and enters into the detector 12, the construction of which is identical to that of the detector 11. The output of the delay line 15 is also supplied to the base of a transistor $Q_4$ in a combination circuit of the carrier pick up circuit 10' and the variable phase shifter 14. That is, a circuit including transistors $Q_4$ to $Q_6$ corresponds to the blocks 10' and 14 in FIG. 9 which function to pick up the carrier and variably shift the phase of the carrier. A first resonance circuit including a coil $L_1$, a capacitor $C_5$ and a variable capacitance diode $D_1$, a second resonance circuit including a coil $L_2$, a capacitor $C_9$ and a variable capacitance diode $D_2$ and a third resonance circuit including a coil $L_3$, a capacitor $C_{12}$ and a variable capacitance diode $D_3$, belonging to the transistors $Q_4$, $Q_5$ and $Q_6$, respectively, perform the carrier pick up and phase shifting functions. The variable phase shift control is performed by changing voltages applied to the variable capacitance diodes $D_1$, $D_2$ and $D_3$ by a variable resistor $R_{23}$ to change the capacitances of the respective diodes.

The output of the combination circuit is supplied to the detector 12 whose output in turn is supplied to the distributed constant variable delay line 15' to finely regulate the delay time. The output therefrom in applied to the base of a transistor $Q_8$ of the gain and polarity control circuit 16. A variable resistor $R_{26}$ of the control circuit 16 regulates the polarity and gain of the output of the fine delay line 15'. When the resistance values of resistors $R_{25}$ and $R_{27}$ are made equal, video signals having the same amplitude and opposite polarities are obtained at a collector and an emitter of the transistor $Q_8$. Therefore the regulations of the polarity and gain of the output of the control circuit 16 can be achieved by regulating the resistor $R_{25}$ and $R_{27}$. The video signal output from control circuit 16 is supplied to the base of a transistor $Q_3$ of the adder 17 and added to the signal supplied from the detector 11 to a base of the transistor $Q_2$ of the adder 17. The video signal having no ghost component is obtained at the output of the adder circuit 17.

Normally, the amplitudes of the video signals from the detectors 11 and 12 are very small, and therefore video amplifiers are disposed after the detectors to amplify the outputs. In FIG. 10, however, these video amplifiers are omitted for simplicity.

Figure 12:
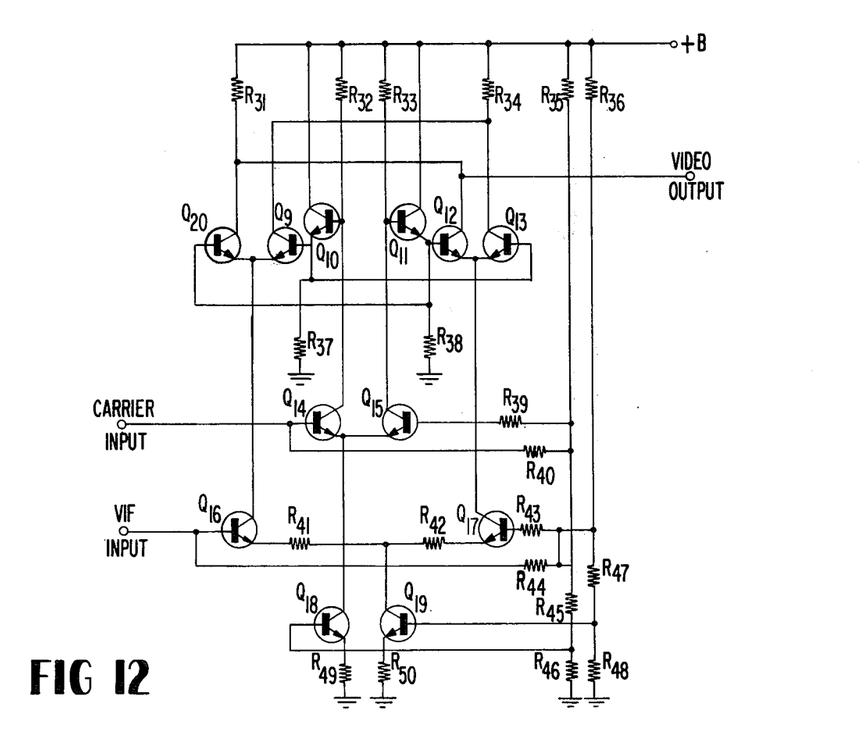
FIG. 12 is a circuit diagram of an example of the synchronous detection circuit suitable to use in the present apparatus.

FIG. 12 shows a specific circuit example of a synchronous or multiplication detector which may be used as the detector 11 or 12 in FIGS. 7, 8, 9 and 10. In FIG. 12, the VIF signal is supplied to the base of a transistor $Q_{16}$ and the carrier component is supplied to the base of a transistor $Q_{14}$. Transistors $Q_{14}$–$Q_{15}$ constitute a differential amplifier which amplifies the carrier, and the amplified carrier passes through transistors $Q_{10}$ and $Q_{11}$ to a differential amplifier comprising transistors $Q_9$, $Q_{12}$, $Q_{13}$ and $Q_{20}$ wherein the amplified components are multiplied by the VIF supplied from the collector of the transistor $Q_{16}$ to the emitters of the transistors $Q_9$ and $Q_{20}$. The synchronously detected video signal output appears across a resistor $R_{31}$.

Figure 13:
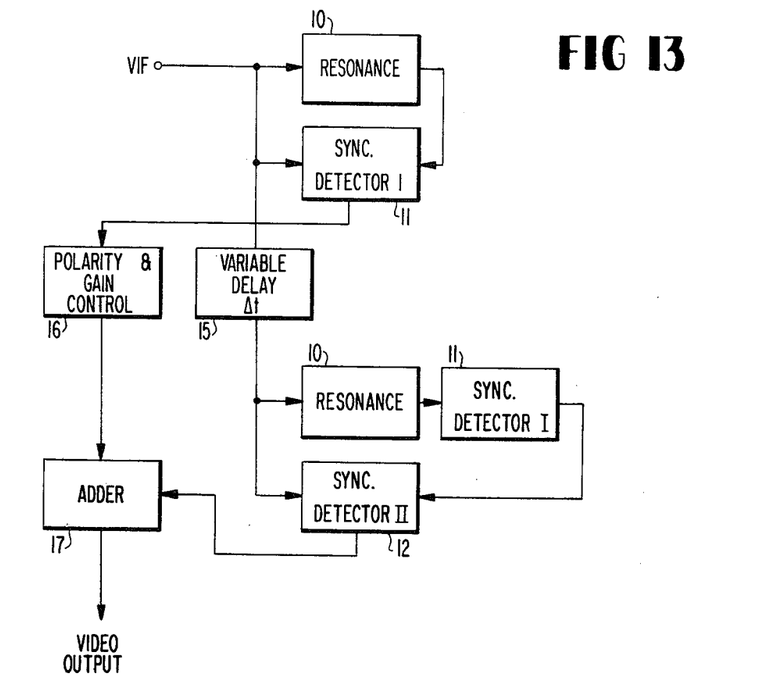
FIGS. 13 and 14 are block diagrams of other embodiments of the present invention.

In apparatus previously described, in the case where the ghost signal arrives at an earlier time than the arrival of the desired wave, for example, in a community receiving system where the signal wave is directly received by the receiver through a window of a building prior to the receiving of the signal through a community antenna, the polarity and gain control device may be inserted into the circuit which has no delay line. In this case, however, the phase relation between the first detection axis and the second detection axis should be reversed. FIG. 13 shows an embodiment suitable for use in this situation.

Figure 14:
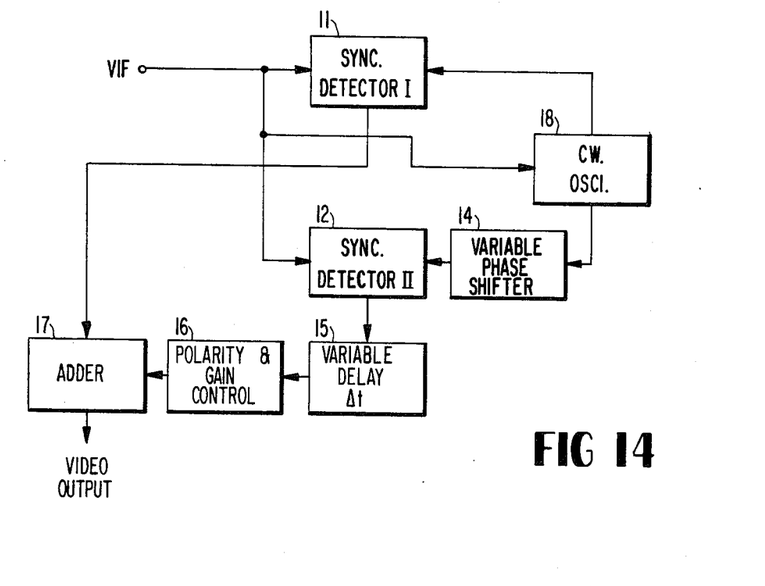

As an additional alternative, the carrier pick-up circuit construction for providing the carrier wave to the synchronous detection circuits may be constructed as a carrier wave oscillator in a phase locked loop rather than as a pair of resonance circuits. In such case, the overall circuit construction is as shown in FIG. 14 with the carrier wave oscillator shown at 18.

As described hereinbefore, according to the present invention, the ghost wave can be removed irrespective of the spatial phase thereof without using any specially designed antenna. Further, the synchronous detection circuit can be easily manufactured in IC form, resulting in the minimization of cost. In addition, the variable delay line is not limited to that shown in FIG. 11. It may be any delay line for VIF band or video band according to the ghost phenomenon to be removed, resulting in an improvement in freedom in designing the circuit. Finally, by increasing the number of the parallel detection circuits correspondingly to the number of ghost waves, the corresponding number of ghost waves can be removed.

What is claimed is:

1. A method for removing a ghost wave received together with a desired wave in a television receiver, comprising the steps of synchronously detecting a video intermediate frequency signal in the television receiver at a first reference phase to provide a first composite video output;

synchronously detecting the video intermediate frequency signal at a second reference phase, which differs from said first reference phase by an angle corresponding to a phase difference between the ghost wave and the desired wave, to provide a second composite video output;

delaying at least one of said video intermediate frequency signal, said first composite video, and said second composite video, an amount to cause said ghost wave in one of said composite video outputs to be in time coincidence with the desired wave in the other of said composite video outputs, and combining said composite video outputs after said delay in a suitable ratio to cause said time coincident ghost wave in one of said composite video outputs and desired wave in the other of said composite video outputs to cancel each other.

2. The method of claim 1 wherein the step of delaying at least one comprises delaying the video intermediate frequency, prior to the second synchronous detection step, by an amount substantially equal to the time difference of arrival between the ghost wave and the desired wave.

3. The method of claim 2 wherein the step of delaying at least one further comprises delaying the second composite video a vernier amount to bring the total delay of said intermediate frequency signal and said second composite signal equal to the time difference of arrival between the ghost wave and the desired wave.

4. The method of claim 3 wherein said step of combining comprises, altering the polarity and amplitude of said delayed second composite video signal by an amount to cause said desired wave signal in said second composite video signal to have a polarity opposite to and an amplitude equal to said ghost wave signal in said first composite video signal, and adding said first and second composite video signals.

5. The method of claim 4 wherein said first reference phase of said video intermediate frequency signal is in phase with the phase of said desired wave signal.

6. The method of claim 1 wherein the step of delaying at least one comprises the step of delaying the said second composite video signal an amount equal to the time difference of arrival between the ghost wave and the desired wave.

7. The method of claim 6 wherein said step of combining comprises, altering the polarity and amplitude of said delayed second composite video signal by an amount to cause said desired wave signal in said second composite video signal to have a polarity opposite to and an amplitude equal to said ghost wave signal in said first composite video signal, and adding said first and second composite video signals.

8. In a television receiver, apparatus for removing the ghost wave received together with the desired wave, said television receiver being of the type which converts the received signals into a video intermediate frequency signal, the apparatus for removing comprising, a. first means for synchronously detecting, at a first reference phase, said video intermediate frequency signal to provide a first composite video output signal, b. second means for synchronously detecting, at a second variable reference phase said video intermediate frequency signal to provide a second composite video output signal, c. variable delay means for adjustably, variably delaying at least one of said video intermediate frequency signals before application to said second means, said first video composite output signal, and said second video composite output signal to thereby adjust the relative times of said ghost and desired waves in said first and second composite video output signals, and d. means for combining said composite video output signals in a controllable ratio, whereby adjustments of said variable phase, said variable delay and said controllable ratio may be selected for removing said ghost wave.

9. Apparatus according to claim 8 wherein said first means for synchronously detecting comprises, a first resonance detector tuned to said video intermediate frequency, said video intermediate frequency signal being applied to the input of said first resonance detector, a first synchronous detector having a first input connected to receive said video intermediate frequency signal, a second input connected to receive the first reference phase output signal from said first resonance means, and an output for providing a detected first composite video signal output, and wherein said second means for synchronously detecting comprises a second resonance detector turned to said video intermediate frequency, said video intermediate frequency signal being applied to the input of said second resonance detector, a variable phase shifter, the output from said second resonance circuit being connected to the input of said variable phase shifter, a second synchronous detector having a first input connected to receive said video intermediate frequency signal, a second input connected to receive the output from said variable phase shifter, and an output for providing a detected second composite video output signal.

10. Apparatus as claimed in claim 8 wherein said variable delay means comprises a variable intermediate frequency delay means connected in advance of said second means for delaying said video intermediate frequency signal prior to said latter signal being applied to said second means.

11. Apparatus as claimed in claim 8 wherein said combining means comprises a polarity and gain control circuit, said second composite video signal being connected to the input of said polarity and gain control circuit, and an adder having two inputs connected respectively to the outputs of said first synchronously detecting means and said polarity and gain control circuits.

12. Apparatus as claimed in claim 8 wherein said combining means comprises a polarity and gain control circuit, said first composite video signal being connected to the input of said polarity and gain control circuit, and an adder having two inputs connected respectively to the outputs of said second synchronously detecting means and said polarity and gain control circuits.

13. Apparatus as claimed in claim 8 wherein said first and second synchronously detecting means comprises, first and second synchronous detectors, each of the multiplication type and each having first and second inputs and an output, a variable phase shifter, an intermediate frequency phase controlled oscillator having an input connected to receive said video intermediate frequency signal and an output connected to the second input of said first synchronous detector and the input of said variable phase shifter, the output of said variable phase shifter being connected to the second input of said second synchronous detector, said video intermediate frequency signal being connected to the first inputs of said first and second synchronous detectors.

14. Apparatus as claimed in claim 8 wherein said variable delay means comprises a variable video signal frequency delay means connected to delay said second composite video output signal.

15. Apparatus as claimed in claim 9 wherein said variable delay means comprises a variable intermediate frequency delay means connected in advance of said second means for delaying said video intermediate frequency signal prior to said latter signal being applied to said second means.

16. Apparatus as claimed in claim 15 wherein said combining means comprises a polarity and gain control circuit, said second composite video signal being connected to the input of said polarity and gain control circuit, and an adder having two inputs connected respectively to the outputs of said first synchronously detecting means and said polarity and gain control circuits.

17. Apparatus as claimed in claim 16 wherein said variable delay means further comprises a video frequency delay means connected to privide a vernier delay to said second composite video output signal, and wherein said intermediate frequency delay means comprises a step-type variable delay line.

18. Apparatus as claimed in claim 17 wherein said step-type variable delay line is an acoustic surface wave delay line and wherein said video frequency delay means is a distributed constant delay line.

* * * * *